(No Model.) 5 Sheets—Sheet 1.

C. S. BROWN & F. B. FARGO.
CHURN AND BUTTER WORKER.

No. 565,719. Patented Aug. 11, 1896.

Witnesses.
O. H. Keeney
Anna V. Faust

Inventors.
Charles S. Brown,
Frank B. Fargo
By Benedict & Morsell
Attorneys.

(No Model.) 5 Sheets—Sheet 2.

C. S. BROWN & F. B. FARGO.
CHURN AND BUTTER WORKER.

No. 565,719. Patented Aug. 11, 1896.

Witnesses.
O. W. Keeney
Anna V. Faust

Inventors.
Charles S. Brown
Frank B. Fargo
By Benedict & Morsell
Attorneys.

(No Model.) 5 Sheets—Sheet 3.

C. S. BROWN & F. B. FARGO.
CHURN AND BUTTER WORKER.

No. 565,719. Patented Aug. 11, 1896.

Witnesses.
C. W. Keeney.
Anna V. Faust.

Inventors.
Charles S. Brown,
Frank B. Fargo,
By Benedict & Morsell.
Attorneys.

(No Model.) 5 Sheets—Sheet 4.

C. S. BROWN & F. B. FARGO.
CHURN AND BUTTER WORKER.

No. 565,719. Patented Aug. 11, 1896.

Witnesses. Inventors.
Charles S. Brown
Frank B. Fargo
By Benedict & Morsell
Attorneys.

(No Model.) 5 Sheets—Sheet 5.
C. S. BROWN & F. B. FARGO.
CHURN AND BUTTER WORKER.
No. 565,719. Patented Aug. 11, 1896.
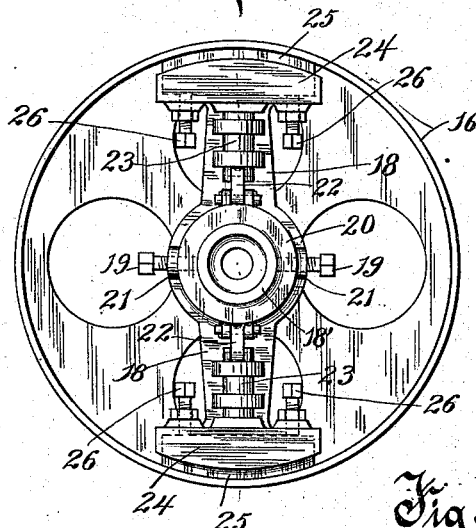
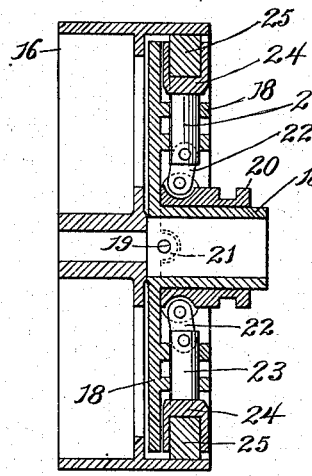
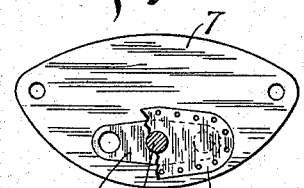
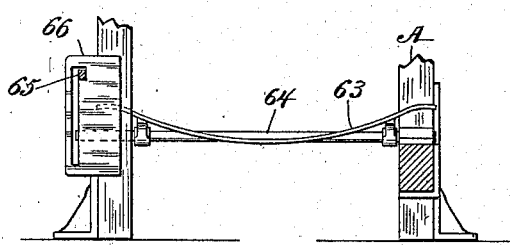
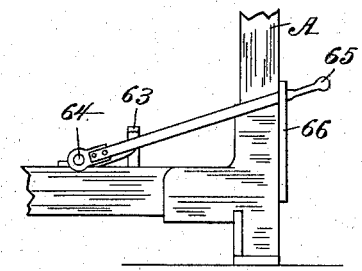
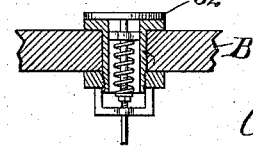
Witnesses.
C. H. Keiney.
Anna V. Faust.
Inventors.
Charles S. Brown.
Frank B. Fargo.
By Benedict & Morsell.
Attorneys.

UNITED STATES PATENT OFFICE.

CHARLES S. BROWN AND FRANK B. FARGO, OF LAKE MILLS, WISCONSIN, ASSIGNORS TO THE F. B. FARGO & COMPANY, OF WISCONSIN.

CHURN AND BUTTER-WORKER.

SPECIFICATION forming part of Letters Patent No. 565,719, dated August 11, 1896.

Application filed May 1, 1895. Serial No. 547,764. (No model.)

*To all whom it may concern:*

Be it known that we, CHARLES S. BROWN and FRANK B. FARGO, of Lake Mills, in the county of Jefferson and State of Wisconsin, have invented a new and useful Improvement in Churns and Butter-Workers, of which the following is a description, reference being had to the accompanying drawings, which are a part of this specification.

Our invention relates to churns and butter-workers that are adapted to be used both as a churn and as a butter-worker, the machine being so constructed that by means of certain shifted and different relations of the mechanical parts therein provided for it can be used at will either as a churn or as a butter-worker.

The invention consists of the various devices and mechanical parts and their arrangements and combinations, as herein described and claimed, or their equivalents.

Figure 1:
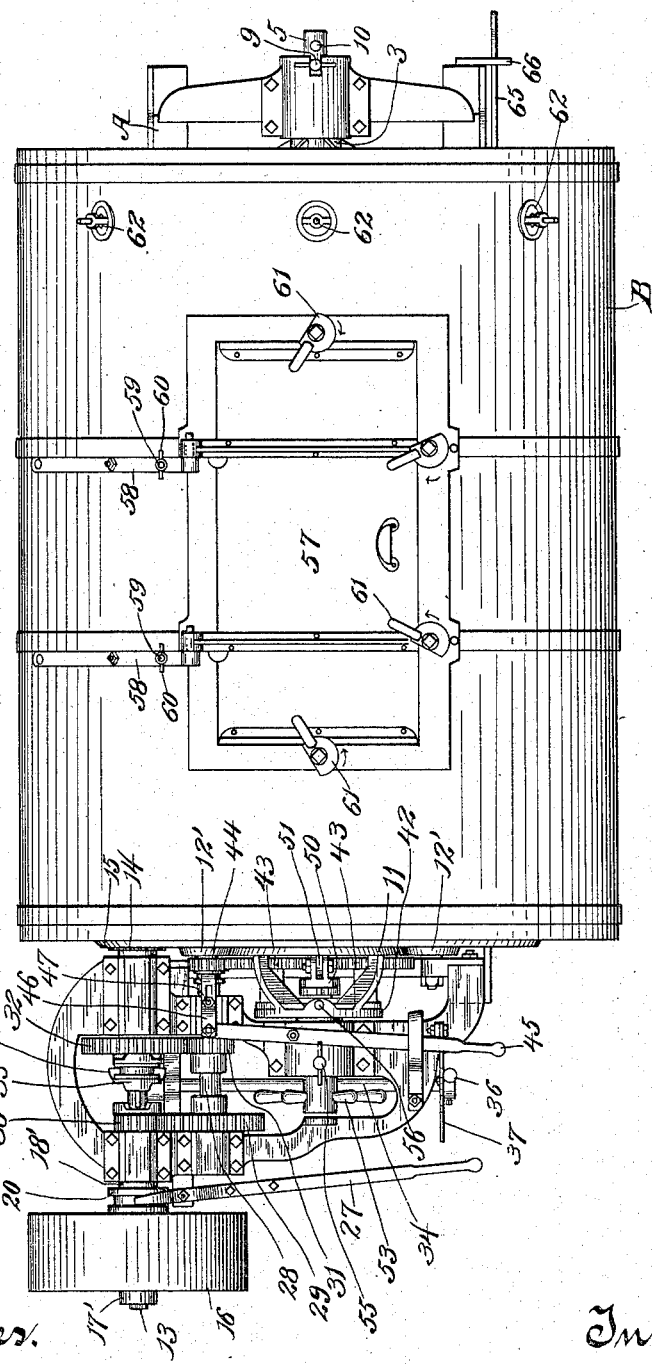
Figure 2:
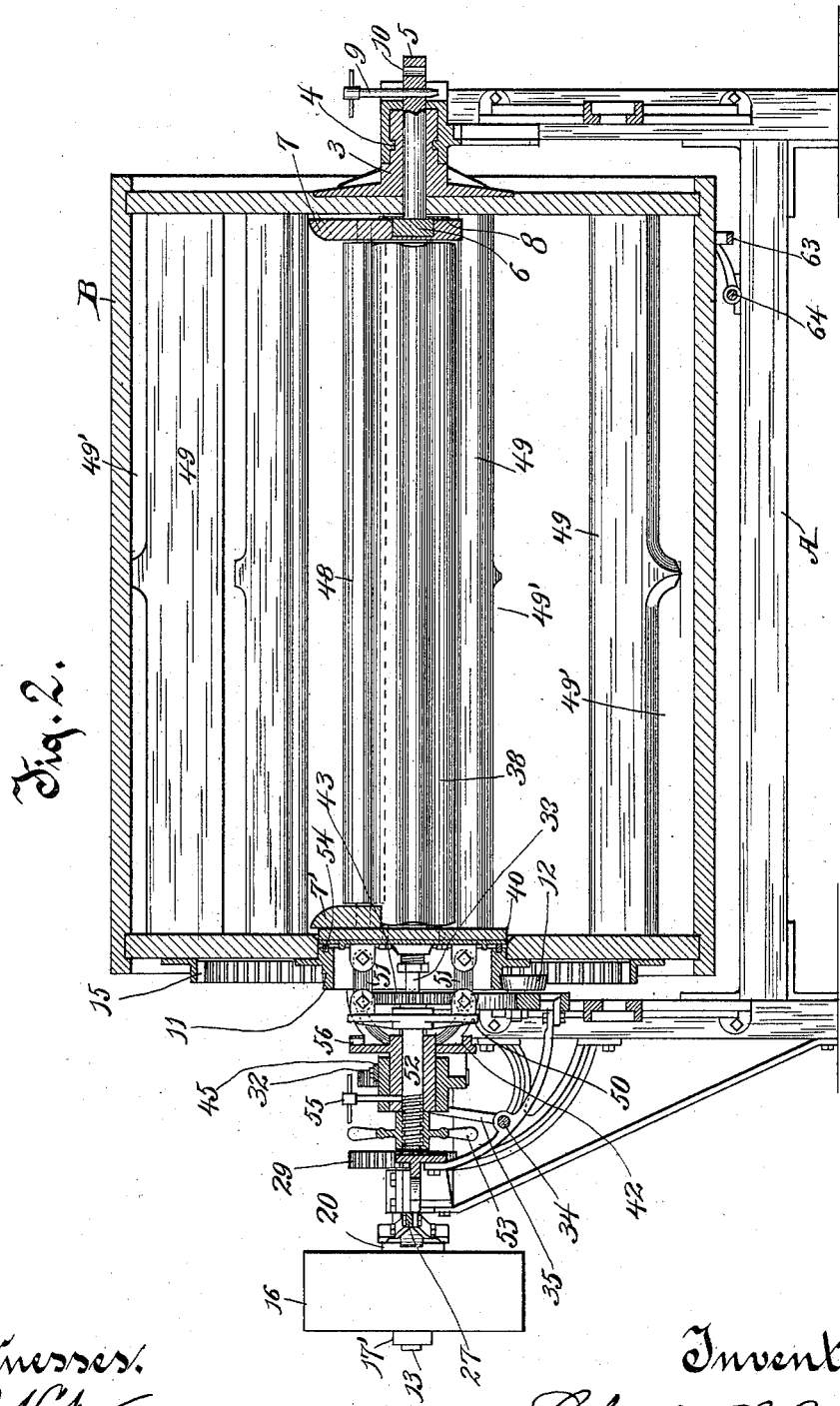
Figure 3:
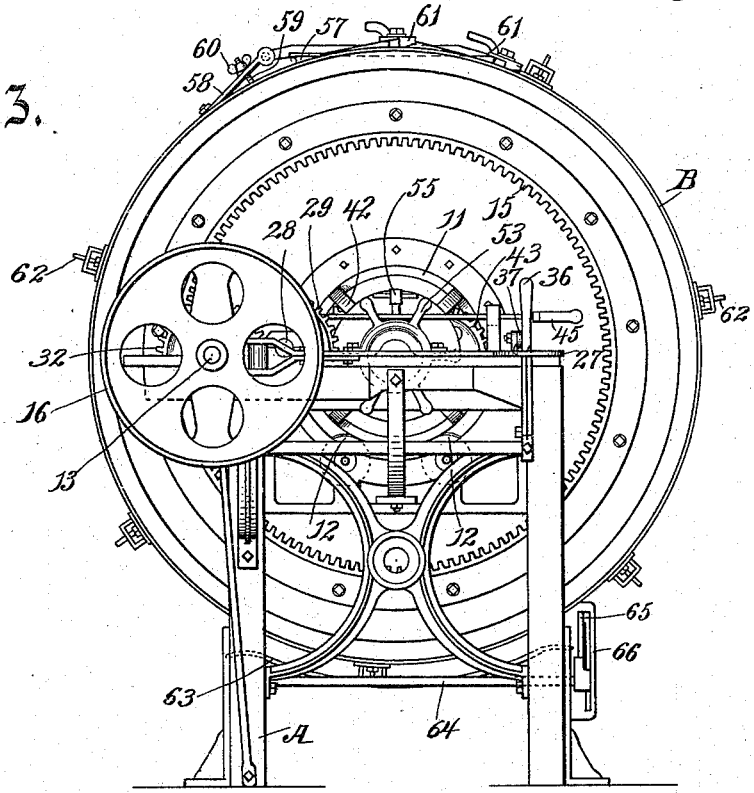
Figure 4:
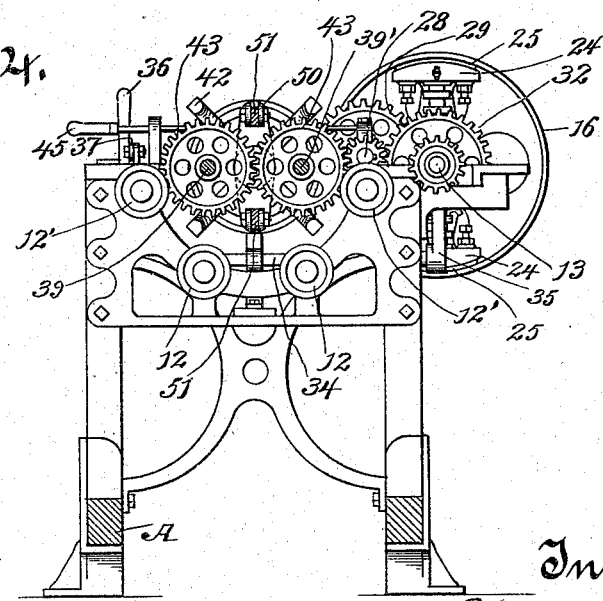
Figure 5:
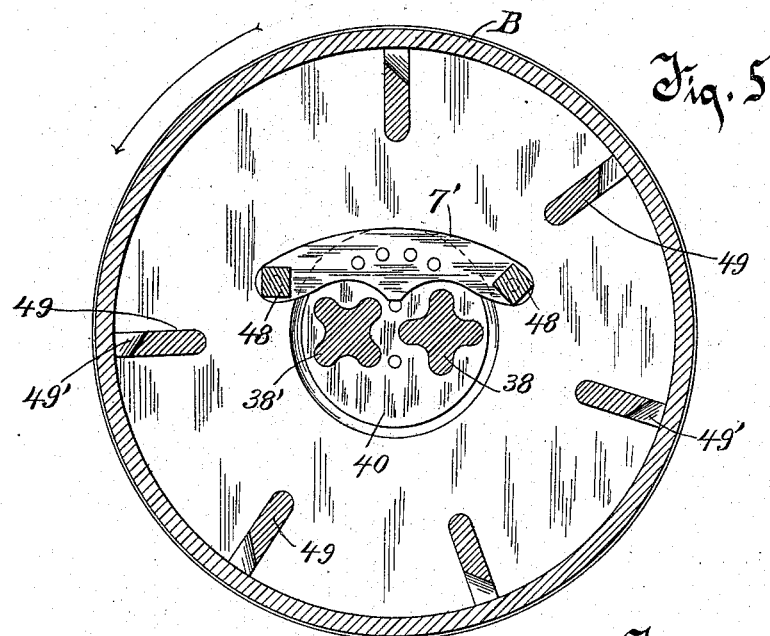
Figure 6:
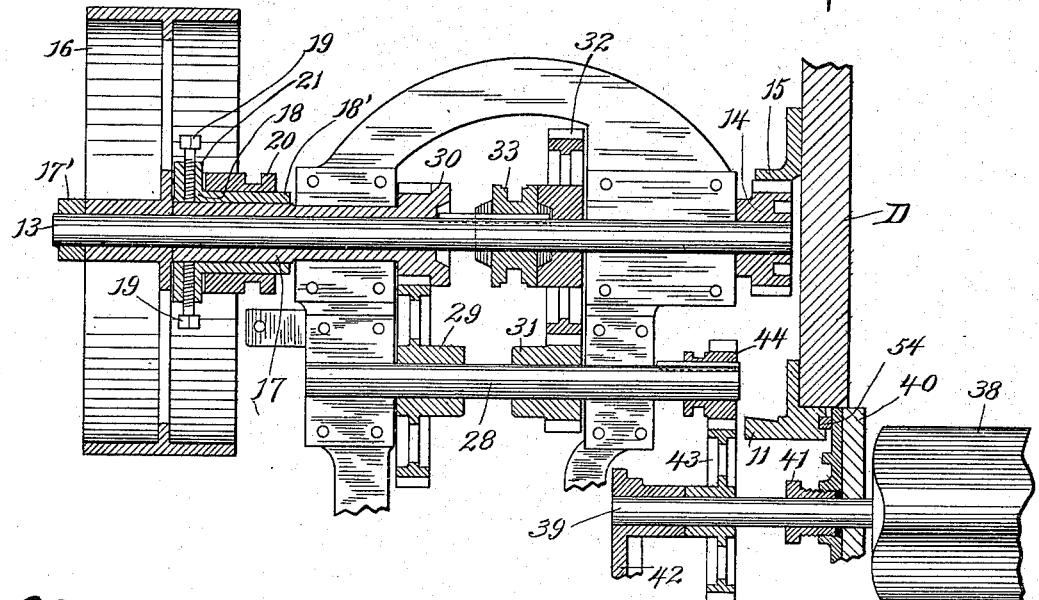

In the drawings, Figure 1 is a top plan view of the complete machine. Fig. 2 is a vertical longitudinal section of the machine. Fig. 3 is a front end elevation of the complete machine. Fig. 4 is an end elevation of the operative mechanism related to and connected with the drum, the mechanism shown being that seen at the left of Figs. 1 and 2, the view being taken from that end of the mechanism that is adjacent to and connected with the drum, looking toward the left of Figs. 1 and 2. Fig. 5 is a transverse vertical section of the drum or case and the devices therein. Fig. 6 is a longitudinal section exhibiting a plan of the principal parts of the mechanism shown in Fig. 4. Fig. 7 is an elevation of the driving-pulley and of a clutch used therewith. Fig. 8 is a central vertical section of the pulley and clutch shown in Fig. 7. Fig. 9 is a detail of the rear cross-head for supporting the butter-working rollers. Fig. 10 is a detail of a device for opening the discharge-valves in the drum or case. Fig. 11 is a detail of the hand-lever for putting the device shown in Fig. 10 into and out of action. Fig. 12 is a detail of a valve closing discharge-opening in the drum.

A is a frame of suitable size and form for supporting the operative parts of the mechanism.

B is a cylindrical case or drum in which the milk is placed for churning or the butter is received for working. At its rear extremity the drum is provided with a gudgeon 3, fixed centrally to the head of the drum and journaled in a box therefor on the frame. The gudgeon is provided with an annular recess, into which an annular flange or rib 4 of the box enters, whereby the gudgeon is prevented from movement endwise in the box and the drum is held against moving endwise on the frame. The gudgeon 3 is bored axially and a solid arbor 5 is journaled therein. The arbor is provided with an integral transversely-elongated solid head 6, to which an integral wood cross-head 7 is secured, conveniently by letting the head 6 into the rear surface of the cross-head 7 and securing it thereto. The rear surface of the head 6 is covered by a sheet or plate 8, of galvanized iron, which is secured to the cross-head 7, thereby covering and completely inclosing the metal of the arbor 5 and its head 6, or so much thereof as is within the drum, so that it will not be exposed to the milk or other fluid in the drum. The plate 8 serves also as a bearing between the cross-head 7 and the head of the drum, and, being of galvanized iron or other non-corrosive material, obviates any discoloration of the milk that might otherwise occur.

A removable pin 9 is inserted in an aperture therefor in the box and through the arbor 5 when the machine is to be used as a butter-worker, whereby the rollers in the drum are prevented from revolving about the axis of the drum. A transverse pin-hole 10 is provided in that portion of the arbor 5 that projects beyond the box, which hole is adapted for the insertion of a pin for the rotation of the arbor limitedly to bring the other transverse aperture therein into registration with the aperture in the box for the insertion of the pin 9.

The front head of the drum is provided with a central aperture, in and about which a hollow annular gudgeon 11 of considerable diameter is fixed to the head. A series of idle-wheels 12 12', preferably four, loosely mounted on pins or studs fixed in the frame below and at the sides of the gudgeon 11, receive and support the gudgeon 11 revolubly thereon. The perimeters of these wheels are preferably beveled, being of greatest diameter at that end adjacent to the head of the drum, and the gudgeon 11 is provided with a correspondingly-inclined surface or groove annularly, in which the peripheries of the wheels are received, whereby endwise movement of the drum on these wheels is also provided against.

A driving-shaft 13 is journaled in the frame in front of the drum and is provided with a pinion 14, meshing with an annular toothed rack 15, secured to the outer surface of the front head of the drum concentrically therewith. The drum is rotated from the shaft 13 through the pinion 14. When the machine is used as a churn, in which comparatively rapid motion is desired, the drum is rotated from the shaft as driven by motion given thereto directly from the band-wheel 16, loose thereon, but which for this purpose is clutched thereto by suitable devices therefor. An elongated sleeve 17, loose on shaft 13, is so journaled in the frame as to prevent endwise movement thereof. The hub of the band-wheel at one end abuts loosely against the end of the sleeve 17 and is prevented from moving on the shaft in the other direction by a collar 17', fixed on the shaft at the other side thereof. A spider 18 is provided with an elongated hub 18', which spider and hub are mounted adjustably on the sleeve 17. The spider is secured to the sleeve 17 adjustably by means of the set-screws 19. A collar 20 encircles the hub of the spider and has movement endwise thereon. Bosses 21 on the spider 18 enter recesses therefor in the collar 20, which construction prevents the revolution of collar 20 on the hub of the spider 18, but permits endwise movement of the collar. Links 22, pivoted on the collar 20, project radially therefrom, preferably at opposite sides of the collar, and these links at their outer extremities are pivoted to the rods or stems 23 of the clutch-heads 24, the stems and heads being integral or rigid to each other. The stems 23 are mounted in suitable bearings therefor in the spider 18 and have movement therein radially or toward and from the driving-shaft 13, and the heads 24 are located opposite to and just within the rim of the band-wheel 16.

Wood blocks or shoes 25 are inserted adjustably in sockets therefor in the outer faces of the heads 24, and these shoes or blocks are adapted to bear frictionally against the inner surface of the rim of the band-wheel 16, when desired, and may be withdrawn therefrom by the shifting of the collar 20. The clutch-shoes 25 are adjustable radially of the shaft by means of the screws 26, turning through the head against the shoes. This provides for compensation for the wear of the shoes.

It will be understood that by shifting the collar 20 toward the drum the clutch will be released from the band-wheel, and that by shifting the collar outwardly toward the web of the wheel the clutch will be made to engage with the band-wheel, thereby compelling the coincident rotation of the sleeve 17 and the band-wheel. The construction is such as to permit the inner or collar-attached ends of the links 22, when shifted toward the web of the band-wheel, to be carried slightly beyond the prolongation of the axes of the stems 23, as shown in Fig. 8, the collar in such position resting against the web of the spider, and thereby locking the clutch mechanism in position, so that it will not be released accidentally by the jar of the machine or otherwise. A lever-handle 27, pivoted medially on the frame, is bifurcated at its inner end, and the extremities of the furcated arms ride in an annular groove therefor in the collar 20, by which means the clutch may be readily operated.

A counter-shaft 28, journaled in the frame, is provided with a gear-wheel 29, which meshes with a pinion 30, rigid on the sleeve 17. A pinion 31, rigid on the counter-shaft 28, meshes with a spur-wheel 32, loose on the shaft 13. A collar 33, splined on the shaft 13, is provided with clutches and is so arranged as at will to be put into engagement with the wheel 32 or with the sleeve 17. By this construction the clutch-collar 33 being in engagement with the wheel 32, as shown in Fig. 6, the motion of the band-wheel 16 is communicated through the sleeve 17 and the counter-shaft 28 to the shaft 13 and therefrom to the drum, which, by reason of the relative size of the respective gears, is thereby driven at a very slow rate of speed, such as is adapted for working butter. Otherwise when the clutch-collar 33 is shifted into engagement with the sleeve 17 the motion of the band-wheel 16 is communicated directly to the shaft 13 and to the drum, thereby giving it a more rapid motion, such as is adapted for churning. The clutch-collar 33 is shifted by the attendant by means of a rock-shaft 34, journaled in the frame, which rock-shaft is provided with a radial arm 35, the furcate extremity of which rides in an annular groove therefor in the collar 33, said rock-shaft being provided with a radially-projecting handle 36 for oscillating it. A swinging latch 37, pivoted on the frame, is provided with notches adapted to take onto the handle 36 and lock it releasably in position.

Corrugated rollers 38 38', substantially as long as the interior of the drum, are located therein near to and parallel with each other and parallel with the axis of the drum, said rollers being journaled at their rear ends in the arbor-heads 6, and at their front ends they are provided with journals 39 39', that, passing liquid-tight through the releasable partial head 40 in suitable stuffing-boxes 41 therefor, are journaled at their extremities in a yoke or spider 42. The legs of this spider 42 rest against the outer surface of the gudgeon 11. The journals of these rollers are provided with spur-wheels 43, which mesh with each other, and one of which meshes with a pinion 44, splined on the counter-shaft 28. A lever-handle 45, pivoted medially on the frame, is provided with a thereto-pivoted finger 46, the extremity of which finger turns down into an annular groove therefor in the hub of the pinion 44 and rides therein, by which means the pinion may be shifted along the counter-shaft 28 into or out of gear with the wheel 43. By putting the pinion 44 into mesh with the wheel 43, as shown in Fig. 6, motion is communicated to the rollers 38 38′ from the band-wheel 16 through the counter-shaft 28. This is required when the machine is used as a butter-worker. A stud or pin 47, fixed in the frame, projects through a slot in the finger 46 and retains it movably in position. Bars 48, one at each side and near to the rollers 38 38′, are journaled at one extremity in the cross-head 7 and at the other extremity in the strip or cross-head 7′, fastened to the releasable head 40. These bars are so disposed with reference to the rollers 38 38′ that when the machine is being used as a butter-worker they are disposed one at each side of and a little above the rollers, as shown in Fig. 5, and thus serve to a certain extent as the sides of a hopper for receiving the butter as it falls from the slash-boards or buckets 49 and guide the butter onto the rollers 38 38′. The series of slash-boards or buckets 49 extend from end to end of the drum in the interior thereof and are secured permanently to the heads of the drum and at distances apart circumferentially, each bucket being preferably cut away to a certain extent near the shell of the drum, as shown at 49′, forming apertures or passages for the escape of milk therethrough.

A yoke 50, located opposite to and in front of the releasable head 40, is connected to the head by links 51, pivoted at their respective ends to the yoke and to the head, and the yoke is provided with an outwardly-projecting stem 52 in the prolongation of the axis of the drum, which stem extends through the hub of the spider 42 and is provided with a screw-threaded hand-wheel 53, turning as a nut on a thread thereon against the outer end of the hub of the spider 42. By this construction the releasable head 40 can be clamped liquid-tight against the inner end of the hollow or chambered gudgeon 11. A cork packing 54, inserted in an annular groove in the inner end of the gudgeon 11, receives the bearing of the releasable head 40 against it and insures the liquid-tight construction of the joint. A removable pin 55, inserted through the frame and into the hub of the spider 42, prevents any torsional movement of the parts at this end of the machine when the machine is being used as a butter-worker. A pin-hole 56 in the spider provides for the inserting of a pin, by means of which the other pin-hole in the spider can be brought to register with the hole in the frame for the insertion of the pin 55.

A door 57 is provided in the shell of the drum for inserting and removing the contents thereof. This door is preferably mounted on the drum by means of hook-and-eye strap hinges. The hook-provided straps 58 at their distant extremities are secured rigidly to the shell of the drum, and near the hook they are so formed (see Figs. 1 and 3) that normally they project outwardly tangentially from the drum and are secured adjustably toward and from the shell by means of bolts 59, fixed in the drum and projecting loosely through sufficiently-enlarged apertures therefor in the straps, which bolts are screw-threaded and are provided with winged nuts 60, adapted to be turned down against the strap of the hinge, which, being elastic, may be forced nearer to the drum and thereby press the door 57 more tightly into the door-aperture and thus be made to securely close the door-aperture. The hook-and-eye joint of the hinges being at a distance from the surface of the drum carries the door entirely away from the shell and wholly out of the door-aperture when the door is swung open downwardly. Cam-latches 61, pivoted on the drum about the edges of the door, are adapted to secure the door in its aperture, the cams on the under side of the latches being adapted to force the door tightly to its seat.

A series of apertures in the walls of the drum, for discharging milk or water therethrough, are closed yieldingly by spring-actuated valves 62. These valves close outwardly and are provided with stems that project beyond the outer surface of the drum. For automatically opening these valves as they successively come to the bottom in the revolution of the drum, we provide a bar 63, extending underneath transversely of the drum, which bar is mounted on the extremities of radial arms on the rock-shaft 64, which rock-shaft is journaled in the frame and is provided with a radially-projecting handle 65, adapted to tilt the rock-shaft and raise the bar 63 into the path of the stems of the valves, so that the valves will be lifted thereby as they successively pass the bar. A slotted plate 66, fixed on the frame, serves as a guide for the handle 65 and is provided with a recess near the upper extremity of the slot, into which the handle may be sprung and thereby locked in position, holding the bar upwardly in the path of the stems of the valves.

It should be understood that when the machine is in use as a churn the sleeve 17 is clutched to the band-wheel; that the shaft 13, by means of the clutch 33, is connected operatively to the sleeve 17, and that the drum is thereby rotated rapidly, the splined pinion 44 on the counter-shaft being shifted out of the path of the wheel 43, that revolves with the roller 38 about the axis of the drum; also, that when the machine is in use as a butter-worker the sleeve 17 communicates motion to the counter-shaft 28 and thence through wheel 32 (clutched therefor by collar 33 to the shaft) to the shaft 13, and that thereby a slower motion is communicated to the drum, but at the same time the cover or head 40 and spider 42 being released, so as to bear movably against the gudgeon 11, and the rollers being secured against revolution about the axis of the drum by pins 9 and 55, inserted, respectively, through arbor 5 and spider 42, the pinion 44 is shifted into mesh with wheel 43, whereby the rollers are rotated for working the butter as it is carried up by the buckets 49 of the slowly-revolving drum and is dropped onto the rollers and passes between them.

What we claim as our invention, and desire to secure by Letters Patent, is—

1. In a churn and butter-worker, the combination with a frame, of a cylindrical drum, a gudgeon fixed to one head of the drum said gudgeon being journaled on the frame and provided with means to prevent endwise movement of the drum, a hollow or chambered annular gudgeon fixed to the other head of the drum about an aperture of considerable diameter therethrough, idle supporting-wheels axled on the frame on which wheels the hollow gudgeon rests and travels, and means for securing the gudgeon on the wheels against endwise movement, substantially as described.

2. In a churn and butter-worker, the combination with a cylindrical drum having one tight head and a gudgeon affixed thereto and another head provided with a releasably-closed central aperture of considerable diameter therethrough, of a pair of rollers in the drum parallel with and adjacent to the axis thereof, an arbor journaled in the gudgeon of the tight drum-head, said arbor having an elongated transverse head in which said rollers are journaled, and a spider mounted revolubly on the frame outside the drum in front of the central gudgeon-aperture through the other drum-head in which spider the other extremities of the rollers are journaled, substantially as described.

3. In a churn and butter-worker, the combination with a cylindrical drum having a tight head and a gudgeon affixed thereto, of an arbor journaled axially in the gudgeon said arbor being provided with a transverse elongated head serving as a revoluble frame or support for a pair of rollers journaled therein, a pin 9 to be inserted in registering holes therefor in the frame and in the arbor to temporarily prevent rotation of the arbor, rollers in the drum mounted at one end in said elongated head, and means supporting said rollers at their other ends conformably with their support in the elongated head, substantially as described.

4. In a churn and butter-worker, the combination with a drum having a head with a central aperture of considerable diameter therethrough, of a pair of rollers in the drum parallel with and adjacent to its axis, said rollers being mounted at their rear ends on an independently-revoluble support, and a spider mounted revolubly on the frame in front of the central head-aperture at the other extremity of the drum in which spider said rollers are journaled, and a pin 55 inserted in registering holes therefor in the frame and in the hub of the spider whereby the spider is held temporarily against revolution, substantially as described.

5. In a churn and butter-worker, the combination with a frame, and a drum having a head with a central aperture of considerable diameter therethrough, said head being provided with a hollow gudgeon or bushing about the aperture fixed therein, of a head or cover for said aperture arranged to bear releasably against the inner end of said gudgeon, a spider 42 in front of said aperture said spider having legs adapted to bear against the outer end of the hollow gudgeon, a yoke connected flexibly to said cover said yoke having a stem extending movably through said spider, and a nut turning on said stem against said spider whereby the cover is clamped to the inner end of the gudgeon through push of the spider against the outer end of the gudgeon, substantially as described.

6. The combination with a cylindrical drum, having a door-aperture, of a door closing said aperture, the hinges whereby said door is mounted on the drum, the straps of the hinges secured to the drum being elastic and so formed and disposed as at their unions to be at a distance outwardly from the drum, and means for drawing the straps nearer to the drum so as thereby to force the door more tightly into the aperture, substantially as described.

7. The combination with a revoluble drum having a ring-gear thereon, of a shaft having a pinion meshing with the ring-gear, a band-wheel loose on the shaft, a sleeve loose on the shaft, means for connecting the sleeve operatively with the band-wheel, a counter-shaft, wheels, pinions and a clutch connecting the counter-shaft operatively with said sleeve and with the shaft, rollers in the drum parallel with and revoluble about the axis of the drum, a pinion splined on the counter-shaft capable of meshing with a wheel on the journal of one of said rollers when said roller is not revolving about the axis of the drum, substantially as described.

8. The combination with a revoluble drum having a ring-gear thereon, of a shaft having a pinion meshing with the ring-gear, a band-wheel loose on the shaft, a sleeve loose on the shaft, means for connecting the sleeve operatively with the band-wheel, a counter-shaft provided with a gear-wheel meshing with a pinion on said sleeve, rollers in the drum parallel with and revoluble about the axis of the drum, and a gear splined on the counter-shaft adapted to be put in mesh with a wheel on the journal of a roller to connect the counter-shaft operatively with the roller when the roller is not revolving about the axis of the drum, substantially as described.

9. The combination with a revoluble drum having a substantially tight head and a head with a large central aperture, of a cross-head in the drum journaled in its tight head, a spider fitted releasably to and supported on the other end of the drum, and a plurality of butter-working rollers in and parallel with the axis of the drum mounted and supported in said cross-head and said spider and revoluble with and independently of the drum, substantially as described.

In testimony whereof we affix our signatures in presence of two witnesses.

CHARLES S. BROWN.
FRANK B. FARGO.

Witnesses:
A. W. GREENWOOD,
GEORGE E. GREENWOOD.